US005555365A

United States Patent [19]

Selby et al.

[11] Patent Number: 5,555,365
[45] Date of Patent: Sep. 10, 1996

[54] METHOD AND SYSTEM FOR OPTIMIZING STATIC AND DYNAMIC BINDING OF PRESENTATION OBJECTS WITH THE OBJECT DATA THEY REPRESENT

[75] Inventors: Robert F. Selby, Austin, Tex.; Shimon Yanai, Nesher, Israel; Pnina Vortman, Ofakin, Israel; Larry Weisberg, Efrat, Israel

[73] Assignee: International Business Machines Corporation, Armonk, N.Y.

[21] Appl. No.: 296,552

[22] Filed: Aug. 26, 1994

[51] Int. Cl.$^6$ .................................................. G06F 3/14
[52] U.S. Cl. ........................ 395/159; 395/155; 395/156
[58] Field of Search .................................. 395/159, 157, 395/160, 161, 135, 650, 700, 155, 156, 158

[56] References Cited

U.S. PATENT DOCUMENTS

| | | | |
|---|---|---|---|
| 4,558,413 | 12/1985 | Schmidt et al. | 364/300 |
| 5,157,768 | 10/1992 | Hoeber et al. | 395/157 |
| 5,193,148 | 3/1993 | Alcorn et al. | 395/157 |
| 5,204,947 | 4/1993 | Bernstein et al. | 395/157 |
| 5,220,657 | 6/1993 | Bly et al. | 395/425 |
| 5,230,063 | 7/1993 | Hoeber et al. | 395/156 |
| 5,243,697 | 9/1993 | Hoeber et al. | 395/156 |
| 5,261,098 | 11/1993 | Katin et al. | 395/650 |
| 5,384,911 | 1/1995 | Bloomfield | 395/157 |
| 5,390,330 | 2/1995 | Talati | 395/700 |
| 5,412,776 | 5/1995 | Bloomfield et al. | 395/160 |
| 5,414,806 | 5/1995 | Richards | 395/135 |
| 5,432,932 | 7/1995 | Chen et al. | 395/650 |

OTHER PUBLICATIONS

C. Cavendish, et al., *Code Generation for Database Applications*, IBM Technical Disclosure Bulletin, vol. 34, No. 10A, Mar. 1992, pp. 321–322.

H. S. Stone, *Technique for Finding Initial Arcs in 2–Matchings*, IBM Technical Disclosure Bulletin, vol. 33, No. 2, Jul. 1990, pp. 407–410.

G. P. Fitzpatrick, et al., *User Interface to Multi–valued Graphical Notebook Tabs*, IBM Technical Disclosure Bulletin, vol. 36, No. 08, Aug. 1993, pp. 649–654.

P. Brightbill, et al., *Dynamic Marquee Selection Support in the Container Control*, IBM Technical Disclosure Bulletin, vol. 36, No. 08, Aug. 1993, pp. 595–598.

G. P. Fitzpatrick, et al., *Drag–Minimize Function for Graphical User Interfaces*, IBM Technical Disclosure Bulletin, vol. 35, No. 5, Oct. 1992, p. 419.

T. R. Haynes, *Multi–Dimensional Booktab Control for Graphical User Interfaces*, IBM Technical Disclosure Bulletin, vol. 34, No. 4A, Sep. 1991, pp. 208–210.

R. Hiraga, et al., *Measurement System for User Interface Design*, IBM Technical Disclosure Bulletin, vol. 34, No. 2, Jul. 1991, pp. 443–445.

H. Ichinomiya, et al., *Host Terminal Emulator Group Window in GUI Environment*, IBM Technical Disclosure Bulletin, vol. 36, No. 05, May 1993, pp. 47–48.

*Primary Examiner*—Mark R. Powell
*Assistant Examiner*—Ruay Lian Ho
*Attorney, Agent, or Firm*—Jeffrey S. LaBaw; Barry J. Bumgardner; Andrew J. Dillon

[57] ABSTRACT

A data processing system having an object oriented environment. The object oriented environment includes a plurality of graphic user interface objects and a plurality of application objects, each graphic user object having a unique identifier and a selected attribute and each application object having a preselected response. Graphic user interface objects associated with an application object are identified. A table is created specifying relationships between the graphic user interface objects and each graphic user interface object and the application object. Each time the application object is initialized, the table is used to specify objects within the application object.

12 Claims, 9 Drawing Sheets

| Resource ID | Control Type | Attribute Name | Depend On ID | Dependency Function |
|---|---|---|---|---|
| rID1 | EF | Title | 0 | |
| rID2 | EF | Info_area_text | 0 | |
| rID3 | PB | NULL | rID6 | |
| rID4 | PB | NULL | rID6 | |
| rID5 | PB | NULL | rID6 | |
| rID6 | EF | Icon_File_Name | 0 | IconfileEF |
| rID7 | CB | Template_Flag | 0 | |
| rID8 | CB | Menubar_Flag | 0 | |

METHOD AND SYSTEM FOR OPTIMIZING STATIC AND DYNAMIC BINDING OF PRESENTATION OBJECTS WITH THE OBJECT DATA THEY REPRESENT

BACKGROUND OF THE INVENTION

1. Technical Field

The present invention is related generally to an improved data processing system, and in particular to a method and system for binding objects. Still more particularly, the present invention is related to a method in a system for binding Graphical User Interface objects Presentation objects and application objects.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of new system software. Each object has certain data attributes and processes or methods that operate on that data. Data is said to be "encapsulated" by an object and can only be modified by the object methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. I.e. a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

One object oriented programming system is the System Object Model (SOM). More information on SOM can be found in SOM objects developer tool kit users guide, version 2.0, June 1993, available from international business machines corporations.

With presently available Graphic User Interface (GUI) applications, many GUI library and tools are available for user independent development. Some are server type tools, others are class libraries. Every application, however, which uses those tools must still provide the code to use those methods or functions.

The GUI tools typically provide some of the necessary code to present the graphic objects (i.e, icon, folder, action bar, entry field, lists, etc.) on the screen. The coding and logical flow of the invocation of those methods/functions as well as special logic for the connections between the GUI objects and the application objects were left to the developer. A GUI object is an object that is visible to a user. An application object is an object that is not visible. Typically, a binding is created between a GUI object and an application object to allow interaction between a user and the application object using a GUI.

It is desirable to be able to predefine the binding between the GUI objects and the application objects in a generic fashion and to relieve the application object from the necessity to write all the required code, which is typically the same for every window, for each control type, across the system, lending to a great deal of redundancy and inefficiency. These features are specifically desirable in an object oriented environment where GUI objects and application objects are present and each one has an attribute which can be defined and addressed.

Therefore, it would be advantageous to have a method and system for providing binding between GUI objects and application objects in a generic way and to relieve the application from the necessity from providing all the required code.

SUMMARY OF THE INVENTION

It is one object of the present invention to provide an improved data processing system.

It is another object of the present invention to provide a method and system for binding objects.

It is yet another object of the present invention to provide a system for binding Graphical User Interface objects Presentation objects and application objects.

The present invention provides a data processing system having an object oriented environment, wherein the object oriented environment includes a plurality of graphic user interface objects and a plurality of application objects, each graphic user object having a unique identifier and a selected attribute and each application object having a preselected response. Graphic user interface objects associated with an application object are identified. A table is created specifying relationships between the graphic user interface objects and each graphic user interface object and the application object. Each time the application object is initialized, the table is used to specify objects within the application object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
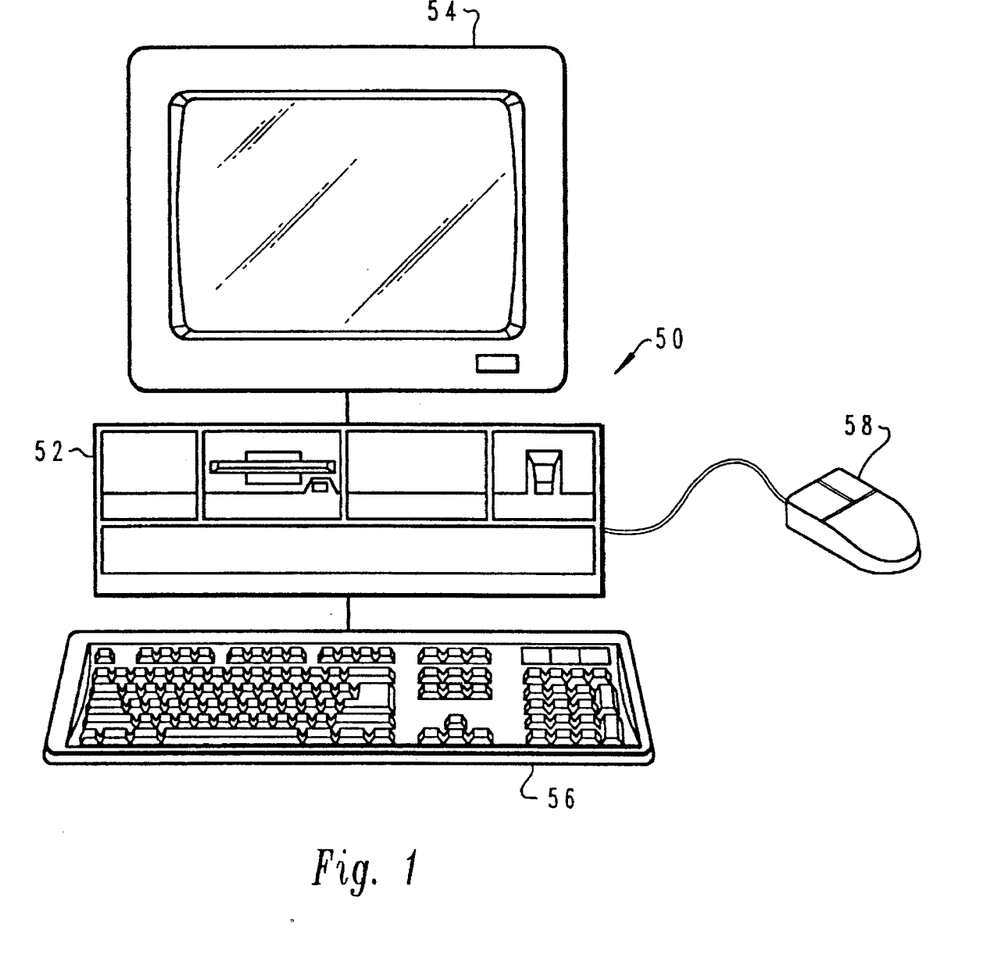
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers. Computer 50 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and PS/2 is a registered trademark of International Business Machines Corporation.

Figure 2:
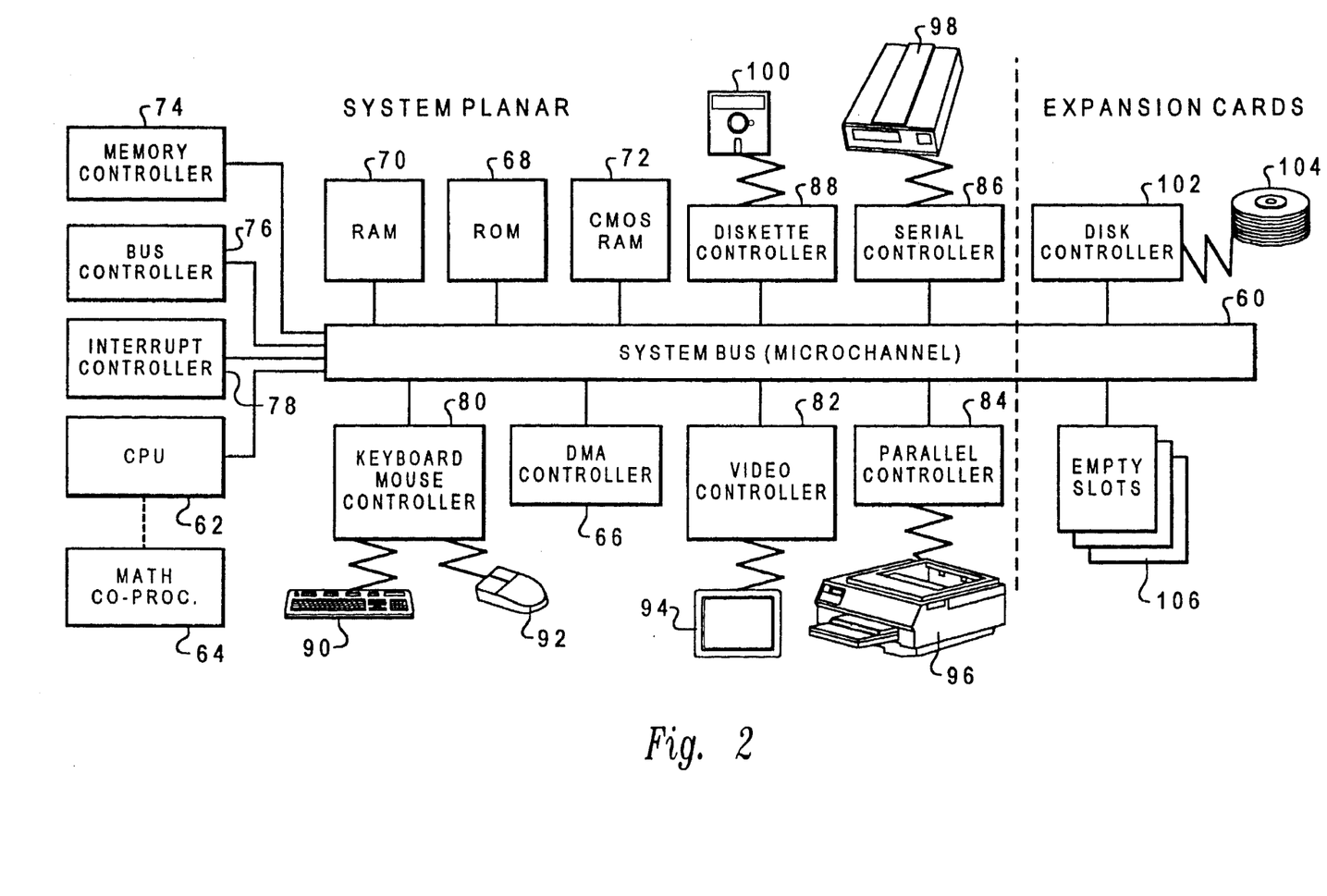
FIG. 2 depicts a block diagram of selected components in the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on serf test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
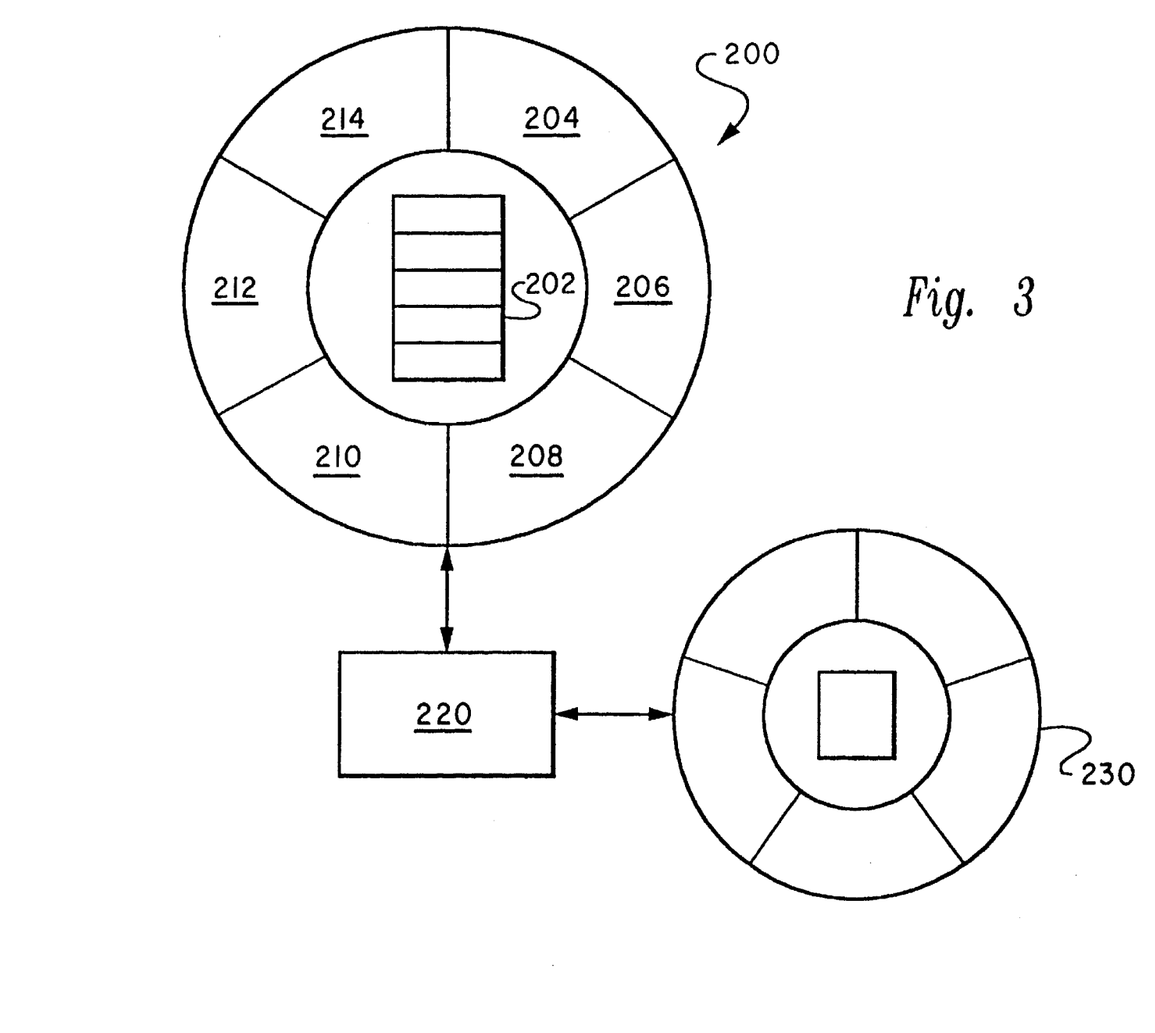
FIG. 3 depicts a diagram of objects in an object oriented environment.

An object encapsulates data and the methods needed to operate on that data. Objects can be represented by a "doughnut diagram" such as shown in FIG. 3. Object data is shown in the center 202 surrounded by the applicable methods 204 to 214. Data 202 may be modified only by the methods of that object. Methods 204–214 are invoked by receiving messages from other objects. A typical object oriented system will have a message router 220 that routes messages between objects. Thus, object 230 causes Method C 208 to be invoked by sending a message 232 to the message router that in turn sends it 222 to Method C 208 of object 200.

Object frameworks are constructed to provide a set of objects for application and system developers to use to construct a delivered system. The IBM System Object Model (SOM) framework, for example, provides a language independent set of objects for use in systems development. The IBM OS/2 Version 2.0 Workplace Shell is an example of an application developed using such an environment.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

The present invention provides a method and system for dynamic binding between resource identifiers of the controls on panels and object attributes. For example, panels and dialogues are always assigned unique resource identifiers. Every control in a dialogue or panel is assigned a unique identifier within the panel or dialogue. With the presence of those unique identifiers, it is possible to bind between those resource identifiers and application object attributes in accordance with a preferred embodiment of the present invention.

The present invention provides a panel resolution mechanism that uses a mapping process as a F(X, Y, T) function of the panel identifier and the control identifier. Based on the type of control and a mapping function between the resource identifiers and object attributes, the panel resolution mechanism evaluates the value and binds the controls to the attributes.

This type of mapping allows an object oriented framework provider to take known characteristics of a given control type and its behavior based on values of other control types (cross control dependencies), and link them together so that once the table of resource IDs and their associated dependencies and even functions to resolve data for that control type, can be specified in a tabular format that is bound together at run time and allows new objects to take advantage of this known behavior.

In addition, the approach of the present invention also allows the dynamic binding to be performed through registration mechanisms at run time, eliminating the need for this to be performed through a compiled interface.

Figure 4:
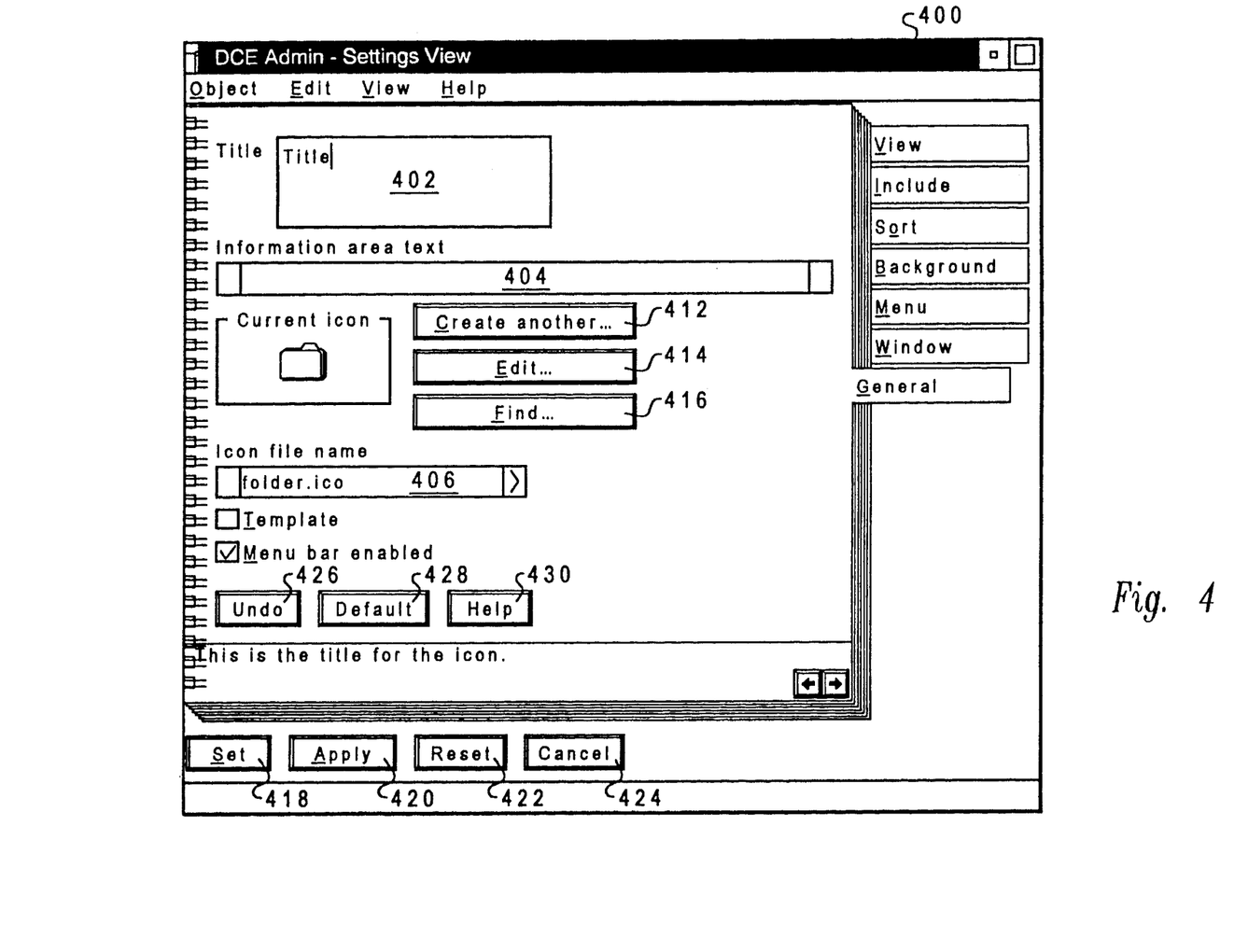
FIG. 4 is a diagram of a panel, also called a window, in accordance with a preferred embodiment of the present invention.

With reference to FIG. 4, a diagram of a panel, also called a window, is depicted in accordance with a preferred embodiment of the present invention. Panel 400 includes a number of controls, such as Title 402, Dil_text 404, icon file name 406, template flag 408, menu bar 410. In addition, panel 400 also includes controls, such as, Create Another 412, Edit 414, Find 416, Set 418, Apply 420, Reset 422, Cancel 424, Undo 426, Default 428, Help 430.

Figure 5:
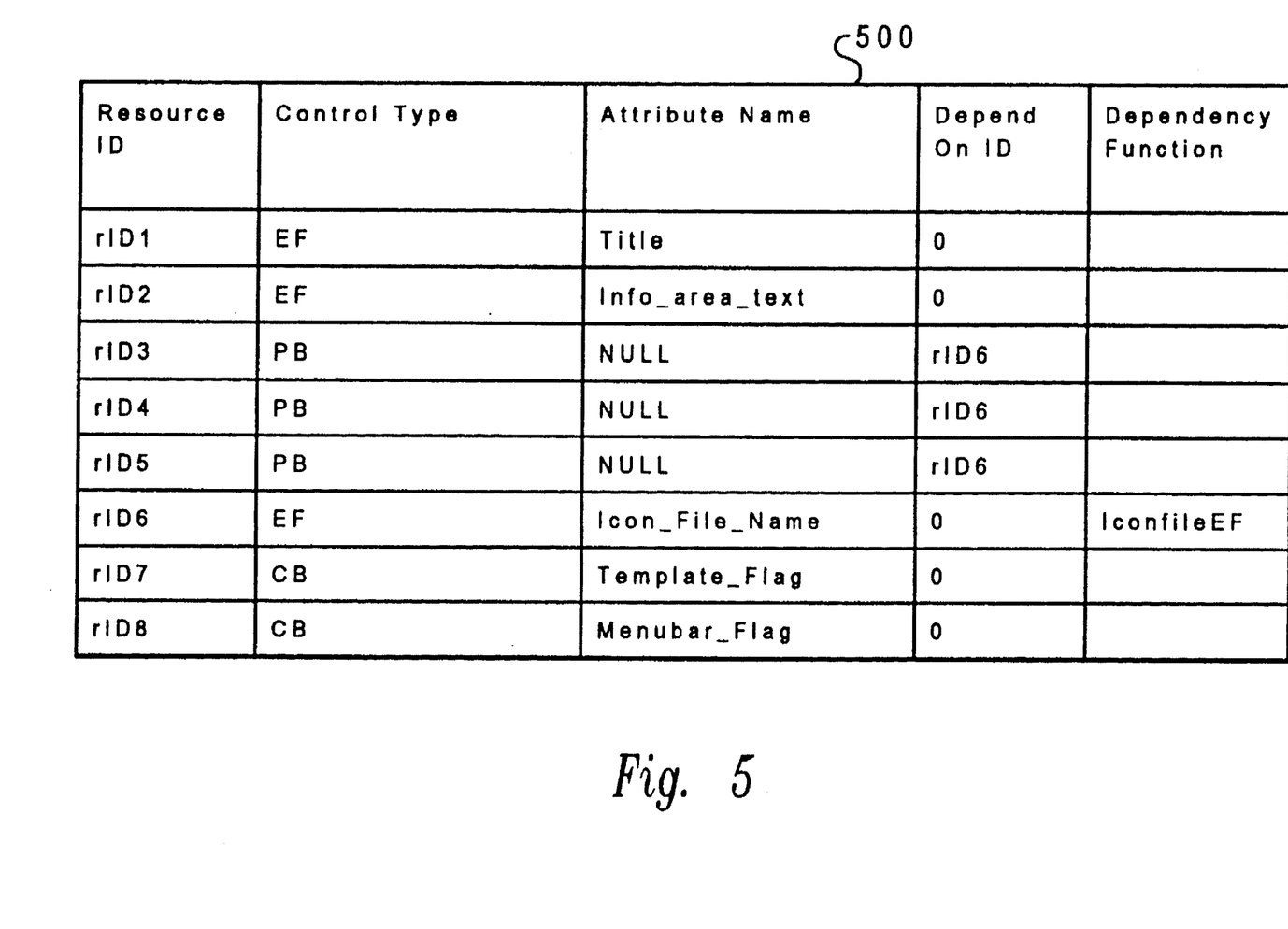
FIG. 5 is a table in which a number of the controls from FIG. 4 are defined and have attributes associated with them.

Referring next to FIG. 5, a panel resolution table 500 is depicted in which a number of the controls from FIG. 4 are defined and have attributes associated with them. The Control Resource ID in table 500 is the unique identification for the control. The Control Type defines the type of control, for example, LB=list box, EF=entry field, PB=push button, CB=check box. The Attribute Name is the name given to the instance data (attribute) of the object, which is associated with this control. The Depend On ID is the Resource ID of the control that this control will depend on. Dependency Function is the function that may be customized and tailored. This function will be invoked every time the panel is displayed, read, or changed.

As can be seen as with reference to FIG. 5 not all of the controls must be defined, only those controls requiring some execution behind them are defined. In the depicted example, title 402 is assigned control resource ID rID1, Dil_text 404 is assigned control resource ID rID2, create another 412 control resource ID rID3, edit 414 control resource ID rID4, find 416 control resource ID rID5, icon file name 406 is assigned control resource ID rID6, template flag 408 is assigned control resource ID rID7, and menu bar 410 is assigned control resource ID rID8. The other controls depicted in FIG. 4 are not assigned control resource IDs.

In accordance with a preferred embodiment of the present invention, control definitions are obtained for panel 400. Then, for each control in panel 400 defined in panel resolution table 500, dependencies are checked for each control. If the dependency is not equal NULL, the present invention checks the attribute name in the control that it is dependent on and enables or disables the control accordingly. Next, the present invention obtains the attributes name for, if the attribute name is not equal to NULL, the present invention obtains the value of the attribute and paints the screen according to the control type.

With reference still to FIG. 4, the text in title 402 is drawn from the attribute Title. The text in Dil_text 404 is draw from the attribute, which stores that text in the object called info_area_text. The text in icon file name 406 is draw from the attribute called Icon_file_name, which stores this text. Push buttons create another 412, edit 414, and find 416 are dependent on the icon file name 406 as can be seen with reference to the fields under Depend On ID column in table 500 in FIG. 5. When this field is empty, the push buttons will be disabled; the push buttons are enabled when the field is not empty. The check box for template flag 408 is set on/off according to the value of attribute of Template_Flag, while the check box for menu bar 410 is set on/off according to value of attribute Menubar_Flag.

Dependent functions are the mechanisms that provide the ability to customize the interaction between the GUI object and the application object for the cases where the generic mechanism is insufficient. Dependency functions receives as a parameter, a pointer to a structure, which contains the following information: the control information retrieved from the panel resolution table; meaning the resource ID, the control type, the associated attribute, the depend On resource ID. The dependency function also contains a flag to indicate where the dependency function is called from. This flag can be set with one of three values: READ, FILL, CHANGE in accordance with a preferred embodiment of the present invention. READ is used to indicate that the panel has been read; FILL indicates that the panel has been display; and CHANGE indicates that the panel has been modified. Dependency functions may be methods or functions and returns one of the following values:

FILL—to indicate that the control must be filled with the value. This will be the case when the dependency function is invoked when the panel is displayed.

READ—to indicate that the value of the control must be retrieved. This will be the case when the dependency function is invoked when the panel is read.

CHANGE—to indicate that the value was changed. This will be the case when the dependency function is invoked as a result of a change or select events to the control.

OK—to indicate that the control should be ignore. In the case of displaying the panel, it means the control will not be set with an attribute value. In the case of reading a panel, it means the control will not be read so that the attribute value will not be set. In the case of changing a control, it will mean the change must be ignored.

Other Values—mean there was an error, the caller will propagate the error so that an error message will be displayed.

Figures 6, 9:
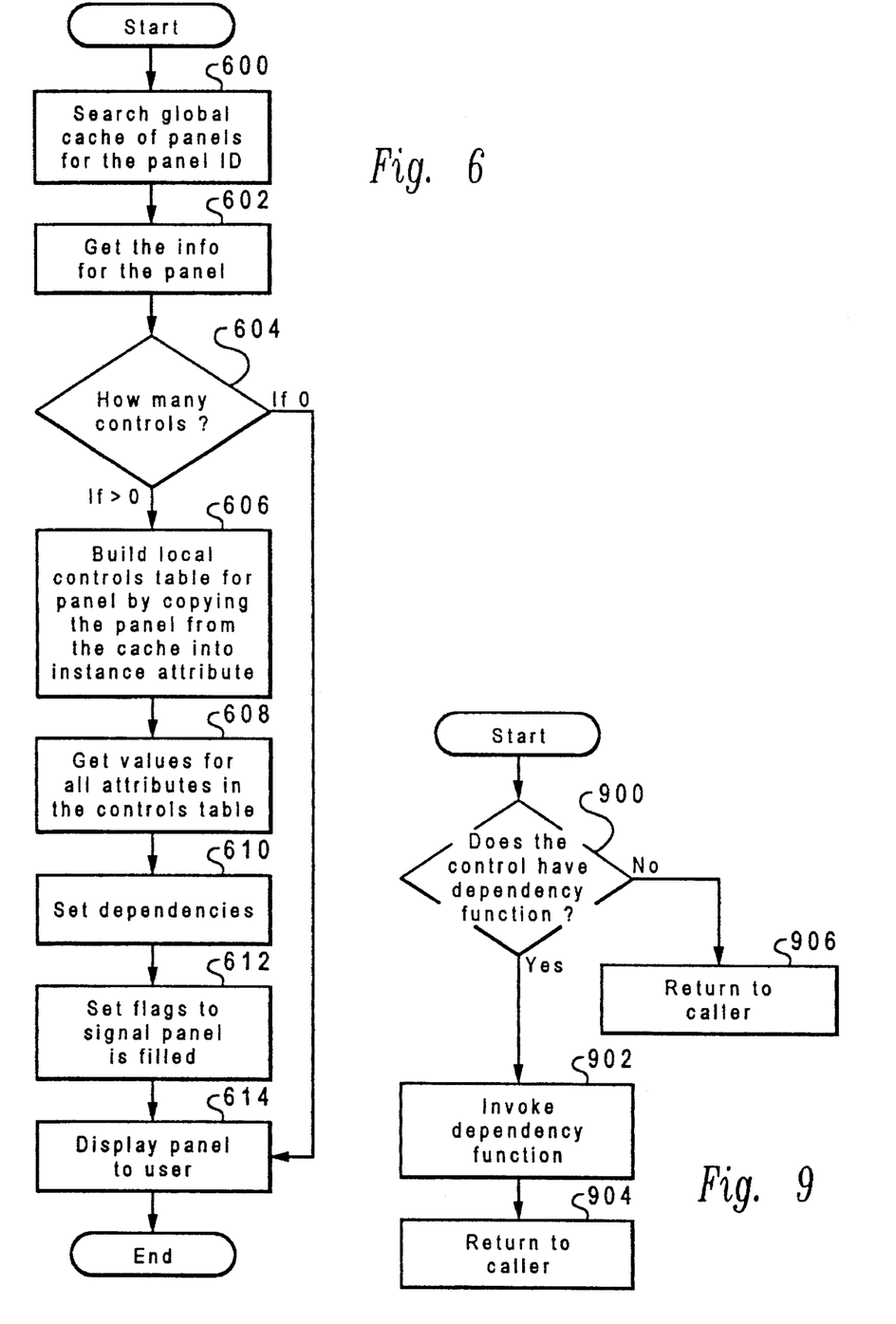
FIG. 6 is a flow chart of a process for managing a display of a panel and for filling its Controls with values from associated data object attributes.
FIG. 9 is a flow chart of a process for performing a dependency check in accordance with a preferred embodiment of the present invention.

With reference now to FIG. 6, a flow chart of a process for managing a display of a panel and for filling its controls with values from associated data object attributes. this process is employed when, a panel is displayed on the screen for the first time, a panel is refreshed, a panel is reset, and when undo is performed on the changes to the panel.

The process begins by searching a global cache of panels for the panel ID (step 600). The process then obtains the information for the panel (step 602). Next, a determination of how many controls are present for the panel is made (step 604). If the number of controls is greater then zero, the process then builds a local controls table for the panel by copying the panel from the cache into the instance attribute (step 606). Then, the process obtains values for all attributes in the controls table (step 608). The process sets up dependencies for the controls in the panel (step 610). The process steps flags to signal that the panel is filled (step 612). The process then displays the panel to the user (step 614) with the process terminating thereafter. Referring again to step 604, if the number of controls is equal to zero, the process terminates.

Figure 7:
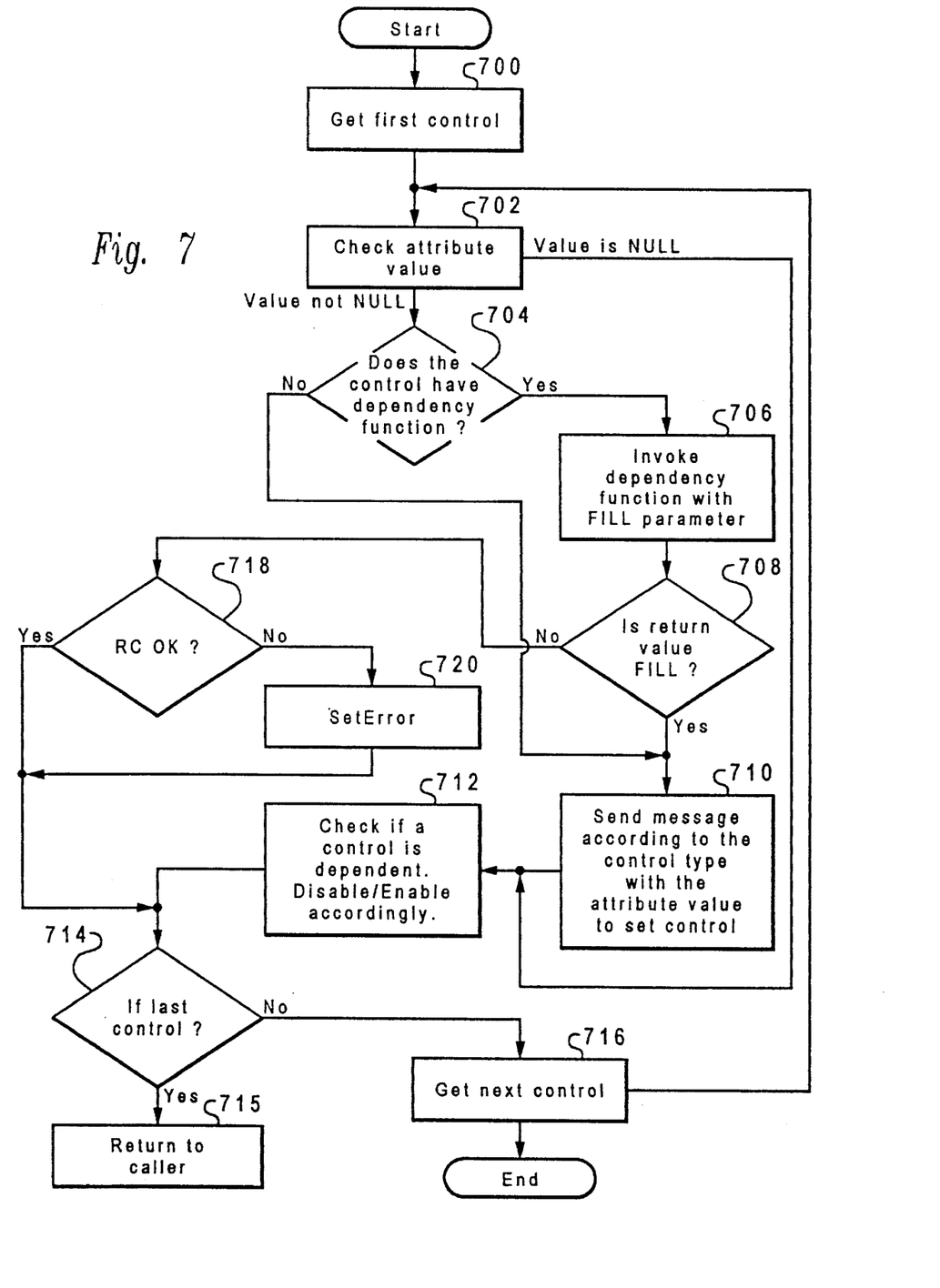
FIG. 7 is a flow chart of a process for setting up dependencies for controls from step 610 in FIG. 6 in accordance with a preferred embodiment of the present invention.

Referring next to FIG. 7, a flow chart of a process for setting up dependencies for controls from step 610 in FIG. 6 is depicted in accordance with a preferred embodiment of the present invention. The process begins by obtaining the first control (step 700). Next, the process checks the attribute value (step 702). The process then determines whether the control has a dependency function (step 704). If the control does have a dependency function, the process then invokes the dependency function with the FILL parameter (step 706). The process then determines whether the return value is FILL (step 708). If the answer to this determination is yes, the process then sends a message according to the control type with the attribute value needed to set the control (step 710). The process then checks if a control is dependent and disable/enables the control accordingly (step 712). Thereafter, the process determines whether the control is the last control in the panel for processing (step 714). If additional controls exists, the process then obtains the next control in the panel (step 716). Thereafter, the process returns to step 702.

Referring again to step 714, if no additional controls exist, the process returns to caller (step 717). Referring back to step 708, if the return value is not FILL, the process then determines whether RC, the return value from the dependency function, is OK (step 718). If RC is OK, the process proceeds to step 714 as described above. If RC is not OK, the process sets an error flag (step 720) prior to proceeding to step 714.

Referring again to step 704, if the control does not have a dependency function, the process proceeds to step 710 as described above. Referring back to step 702, if the attribute value is NULL, the process proceeds directly to step 712 as described previously.

Figure 8:
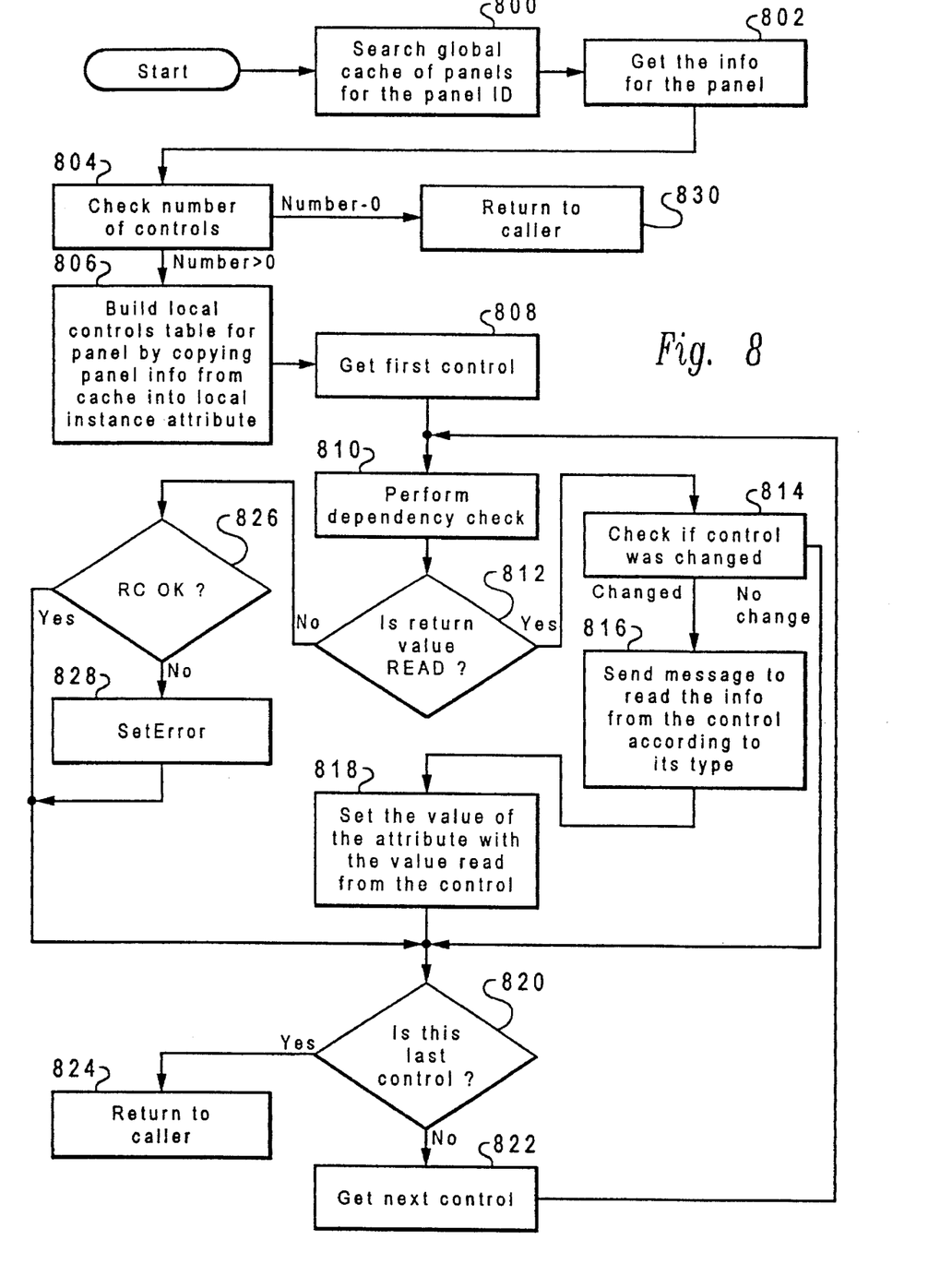
FIG. 8 is a flow chart of a process for managing the reading of information from a panel in accordance with a preferred embodiment of the present invention.

With reference now to FIG. 8, a flow chart of a process for managing the reading of information from a panel is depicted in accordance with a preferred embodiment of the present invention. The process retrieves information from the controls and sets values in the associated data objects' attributes when a user clicks on a pushbutton which invokes a method which will read the panel, the user closes the window and the panel must be read, and a process decides to read the panel.

The process begins by searching the global cache of panels for the panel ID (step 800) and then obtains the information for the panel (step 802). The number of controls is then determined for the panel (step 804). If the number of controls is greater then zero, the process builds a local controls table for the panel by copying panel information from the global cache into a local instance attribute (step 806). Next, the process obtains the first control in the panel (step 808) and performs a dependency check (step 810). The process then determines whether the return value is READ (step 812). If the return value is READ, the process then checks to determine whether the control has been changed (step 814). If the control was changed, the process then sends a message to read information from the control according to its type (step 816). Then, the process sets the value of the attribute with the value read from the control (step 818). The process then determines whether this was the last control (step 820). If the answer to this determination is no, the next control is obtained for processing (step 822) with the process for returning to step 810. Otherwise, the process returns to caller (step 824).

Referring back to step 814, if the control was not changed, the process proceeds directly to step 820, as described above. Referring again to step 812, if the return value is not READ, the process then determines whether RC, the return value from the dependency function, is OK (step 826). If RC is OK, the process proceeds to step 820 as described above. If RC is not OK, the process sets an error flag (step 828) prior to proceeding to step 820. Referring back to step 804, if the number of controls is equal to zero, the process then returns to caller (step 830).

Referring next to FIG. 9, a flow chart of a process for performing a dependency check is depicted in accordance with a preferred embodiment of the present invention. The process begins by determining whether the control has a dependency function (step 900). If the control does have a dependency function, the process then invokes the dependency function (step 902) and then returns to caller (step 904). Referring back to step 900, if the control does not have a dependency function the process then returns to caller (step 906).

Figure 10:
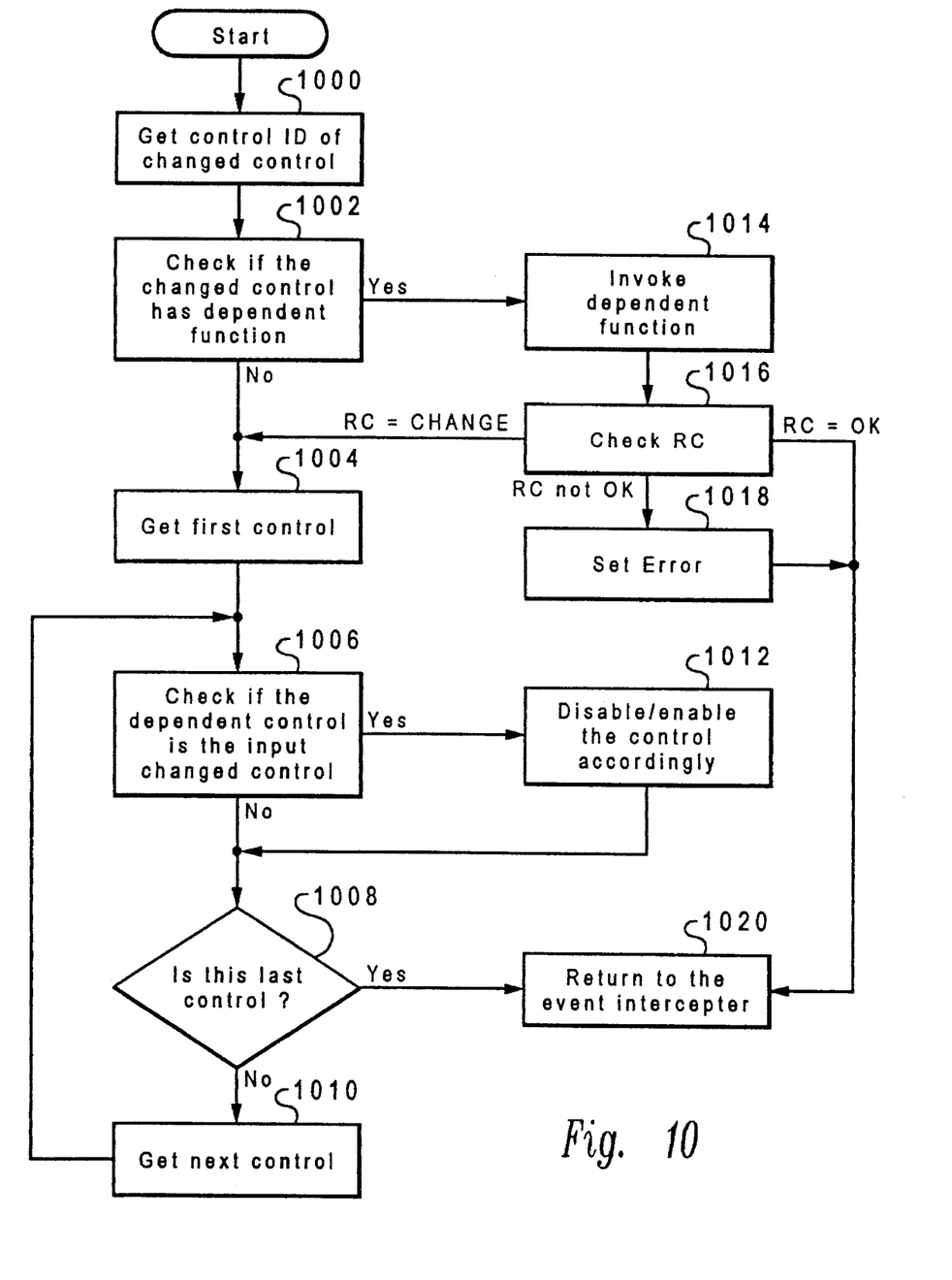
FIG. 10 is a flow chart with a process for managing the enabling/disabling of a control when changes to a panel occur in accordance with a preferred embodiment of the present invention.

Changes to a panel may occur when a user types in an entry field or selects a control. In response to such user input, event messages are sent. These event messages are intercepted by the present invention and the process in FIG. 10 is invoked. With reference now to FIG. 10, a flow chart with a process for managing the enabling/disabling of a control when changes to a panel occur in accordance with a preferred embodiment of the present invention. The process may be invoked when the user types in a control in the in the panel (entryfield, ddcombo, multiline entryfield), and the user selects a control (radiobutton, icon etc.).

The process begins by obtaining the control ID of the changed control (step 1000). The process then determines if the changed control has a dependency function (step 1002). If the changed control does not have a dependency function, the process then obtains the first control (step 1004). Thereafter, the process determines whether the dependent control is the the control that was changed by the user (step 1006). If the answer to this determination is no, the process then determines whether this control is the last control in the panel (step 1008). If additional controls are present in the panel, the process obtains the next control (step 1010) and returns to step 1006. Otherwise, the process returns to the caller (step 1020). Referring back to step 1006, if the dependent control is the control changed by the user. The process then disables/enables the control accordingly (step 1012) with the process then proceeding to step 1008.

Referring back to step 1002, if the changed control has a dependency function, the process invokes the dependency function (step 1014). The process then checks RC the return value from the dependency function (step 1016). If RC equals change, the process then proceed to step 1004 as described above. If RC is not OK, the process proceeds to set an error flag (step 1018) with the process then returning to the caller (step 1020).

While the invention has been particularly shown and described with reference to a preferred embodiment, it will be understood by those skilled in the art that various changes in form and detail may be made therein without departing from the spirit and scope of the invention.

What is claim is:

1. A method in a data processing system having an object oriented environment, wherein said object oriented environment includes a plurality of graphic user interface objects and a plurality of application objects, each graphic user object having a unique identifier and a selected attribute and each application object having a preselected response, said method comprising:

identifying graphic user interface objects associated with an application object;

creating a table specifying relationships between said graphic user interface objects and each graphic user interface object and said application object; and each time said application object is initialized, utilizing said table to specify objects within said application object.

2. A data processing system having an object oriented environment, wherein said object oriented environment includes a plurality of graphic user interface objects and a plurality of application objects, each graphic user object having a unique identifier and a selected attribute and each application object having a preselected response, said data processing system comprising:

identification means for identifying graphic user interface objects associated with an application object;

creation means for creating a table specifying relationships between said graphic user interface objects and each graphic user interface object and said application object; and utilization means, responsive to initialization of said application object, for utilizing said table to specify objects within said application object.

3. A method for displaying a panel in a data processing system having an object oriented environment, wherein the object oriented environment includes a plurality of graphic user interface objects and an application having at least one panel for display to a user, the method comprising:

identifying a number of controls associated with the panel;

for each control identified, creating a table for the panel;

obtaining values for all attributes within the table;

setting up dependencies for the controls and the panel; and displaying the panel.

4. The method of claim 3, wherein setting step comprises:

selecting a first control from the number of controls;

determining whether the selected control has a dependency function;

invoking the dependency function in response to the presence of the dependency function; and responsive to an indication that the control must be filled with an attribute value, sending the attribute value required to set the dependency function for the control.

5. A data processing system comprising:

identification means for identifying a number of controls associated with a panel for display within the data processing system, wherein the panel is associated with an application;

creation means for creating a table for the panel;

means for obtaining values for all attributes within the table;

setup means for setting up dependencies for the controls and the panel; and displaying the panel.

6. The data processing system of claim 5, wherein the creation means includes means for specifying the unique identifier, the selected attribute, and an identification of another control from which the control will depend.

7. The data processing system of claim 6, wherein the means for specifying further includes means for specifying a dependency function associated with the control, wherein the dependency function is invoked each time the application is initialized.

8. A method in a data processing system for displaying a panel in the data processing system having an object oriented environment, wherein the object oriented environment includes a plurality of graphic user interface objects and an application having at least one panel for display to a user, the method comprising:

identifying a number of controls associated with the panel;

for each control identified, creating a table for the panel;

obtaining values for all attributes within the table;

setting up dependencies for the controls and the panel; and displaying the panel.

9. The method of claim 8, wherein setting step comprises:

selecting a first control from the number of controls;

determining whether the selected control has a dependency function;

invoking the dependency function in response to the presence of the dependency function; and responsive to an indication that the control must be filled with a value, sending the attribute value required to set the dependency function of the control.

10. A data processing system for displaying a panel in the data processing system having an object oriented environment, wherein the object oriented environment includes a plurality of graphic user interface objects and an application having at least one panel for display to a user, the method comprising:

identification means for identifying a number of controls associated with the panel;

for each control identified, creation means for creating a table for the panel;

obtain means for obtaining values for all attributes within the table;

setup means for setting up dependencies for the controls and the panel; and display means for displaying the panel.

11. The data processing system of claim 10, wherein setting step comprises:

selection means for selecting a first control from the number of controls;

determination means for determining whether the selected control has a dependency function;

invoke means for invoking the dependency function in response to the presence of the dependency function; and response means for responsive to an indication that the control must be filled with a value, sending the attribute value required to set the control.

12. A storage device readable by a data processing system and encoding data processing system executable instructions for the data storage device comprising:

identification means for identifying graphic user interface objects associated with an application object;

creation means for creating a table specifying relationships between one graphic user interface objects and each graphic user interface object and the application object; and utilization means, responsive to initialization of the application object, for utilizing the table to specify objects within the application object, wherein the means are activated when the storage device is connected and accessed by a data processing system.

* * * * *